UNITED STATES PATENT OFFICE.

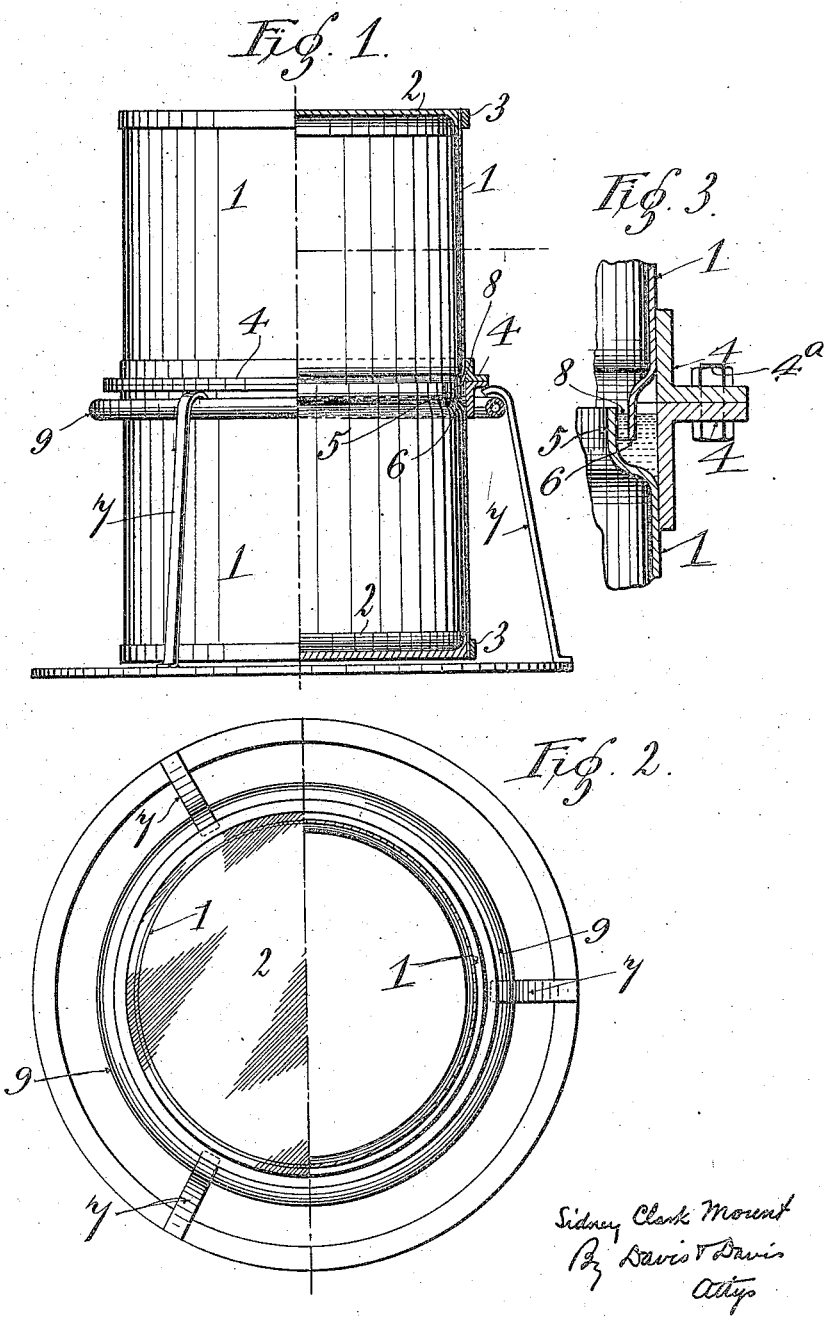

SIDNEY CLARK MOUNT, OF SOUTHALL, ENGLAND.

METAL CASK, DRUM, OR THE LIKE.

1,423,673. Specification of Letters Patent. Patented July 25, 1922.

Application filed May 9, 1921. Serial No. 468,065.

*To all whom it may concern:*

Be it known that I, SIDNEY CLARK MOUNT, a subject of the King of Great Britain and Ireland, residing at Southall, in the county of Middlesex, England, have invented Improvements in or Relating to Metal Casks, Drums, or the like, of which the following is a specification.

This invention relates to metal casks, drums and like containers of the kind which are divided transversely of their length and united there by mechanical devices so that they can be separated when required, and particularly to such casks in which the ends merge into the side walls so that there are no inaccessible corners which is advantageous for the conveyance and storage of liquids, plastic or other materials or substances which soil the interior and hence may necessitate cleaning of the cask or equivalent after it has been used and emptied.

The object of the present invention is to provide improved constructions of the kind referred to in which however the jointing means relied upon for obtaining the necessary mechanical uniting strength, is supplemented by a hermetical joint that is relied upon solely for sealing purposes and, not being subject to stresses due to use of the cask or the like, is made with the aid of a medium having a relatively low melting point, and the application of heat as hereinafter set forth. Such a supplementary joint is not to be confused with one effected by welding, which must of necessity be external, involves heating of the parts to a high temperature and does not ensure a ready breaking of the joint when purposely desired. On the contrary the supplementary joint according to the invention may be within the container where it is possible to melt soft solder or alloy without raising the temperature of the parts of the container to anything like a welding heat. For filling and unfilling purposes any appropriate bung hole or aperture for a stopper or the like may be provided, the drum being easily washed out by temporarily separating the parts when so desired. For convenience in handling, rolling rings of any of the usual forms may be provided at appropriately spaced regions such rings being secured to the walls by external welding to prevent the formation of any roughness in the interior.

In the accompanying drawings, Fig. 1 is a view, half in elevation and half in section, illustrating one constructional form of drum according to the invention. Fig. 2 is a corresponding plan, and Fig. 3 is a view to a larger scale of a part of Fig. 1.

As here shown the drum is made in two parts each comprising a cylindrical member 1 of stout sheet metal into which a dished end 2 is welded, 3 being an external strengthening ring. To each member 1 is also welded an external flanged ring 4 adapted to engage one another so that they can be joined together as by bolts $4^a$. This particular drum is intended to be hermetically sealed by heat treatment for which purpose each member 1 is fashioned to the shape shown so that the margin 5 of one member constitutes with the companion flanged ring 4 an annular channel adapted to receive the margin 6 of the other member which protrudes beyond its companion ring 4. In assembling such a drum the member 1 provided with the annular channel is supported as upon a tripod 7 so that a jointing medium 8 such as solder or bituminous material adapted to melt at a relatively low temperature can be placed in the channel in order to effect a union between the margins 5 and 6. Heat may be applied to establish the joint or enable it to be broken, in any convenient way, a Bunsen ring burner 9 being shown as carried by the tripod 7 for this purpose. The solder or equivalent joint is thus relied upon only for sealing purposes, the requisite mechanical strength being secured by the rings 4, which abut and may together serve as a central rolling ring, although it is to be understood that the joint may be made at any other suitable part in the length of the drum. Where practicable the ends 2 may be in one with the members 1, produced as by pressing. It will thus be seen that any blow on the barrel ends will not affect the seal as is the case with most packed joints but will be absorbed by the two flanged rings.

What I claim is:—

1. A metal cask comprising separable parts, mechanical jointing means connecting said parts together and supplementary jointing means relied upon solely for sealing purposes, such supplementary jointing means containing a medium having a relatively low melting point and the joint being made and broken by the application of heat thereto, substantially as described.

2. A metal cask comprising separable parts, external mechanical jointing means arranged adjacent to the contiguous edges of the said parts and internal jointing means, containing a medium having a relatively low melting point, located in proximity to the external jointing means, the last named means taking up mechanical stresses to which the barrel may be subjected and the internal joint, which is relied upon solely for sealing purposes, being made and broken by the application of heat thereto, substantially as described.

3. A metal cask comprising a metal member having a margin located nearer the centre of the cask than the main part of the member, a flanged ring attached to the main part of the member so as to form with the margin aforesaid a channel, a companion metal member also having a margin located nearer the centre of the cask than the main portion thereof and adapted to enter the channel aforesaid, a flanged ring attached to the said second member and adapted to be connected to the first named ring mechanically, as by bolting, and a medium having a relatively low melting point in the channel adapted to be melted by heat applied externally to the barrel so as to form a sealing joint supplementary to the joint formed by the rings and connecting means, substantially as described.

4. A metal cask comprising separable parts, internal jointing means therefor containing a medium having a relatively low melting point and external mechanical jointing means adjacent to the internal jointing means said external means being adapted to be supported by a tripod having a Bunsen ring by which heat can be applied externally to the barrel to melt the medium of the internal jointing means in order to make and break the same, substantially as described.

Signed at American consulate, London, England, this 21st day of April 1921.

SIDNEY CLARK MOUNT.